March 5, 1946. W. R. TUCKER ET AL 2,395,979
TORQUE AMPLIFIER
Filed Dec. 18, 1941 2 Sheets-Sheet 1
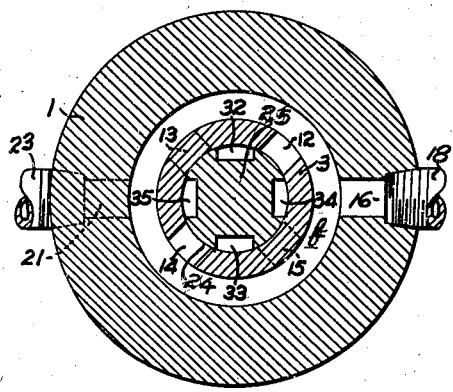
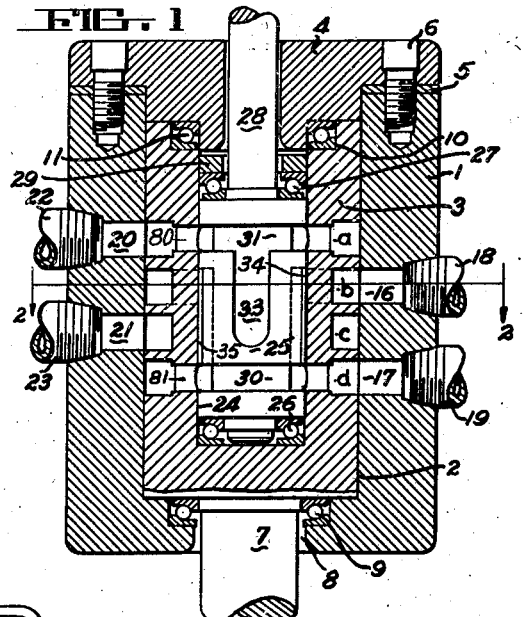
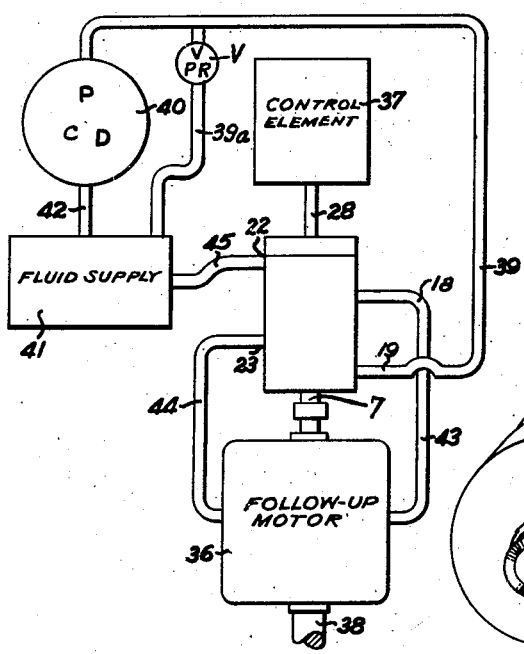
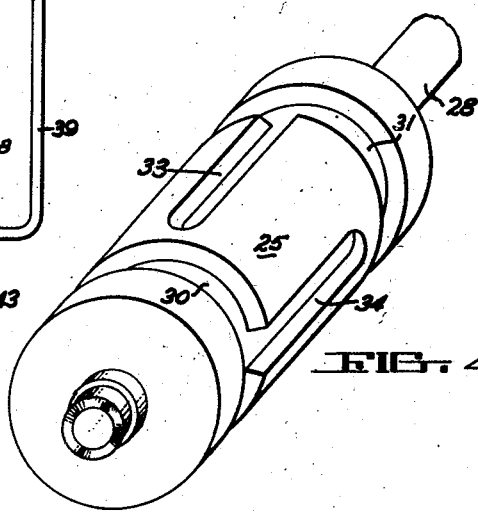
INVENTORS
WARREN R. TUCKER
GEORGE A. WALDIE
ATTORNEYS

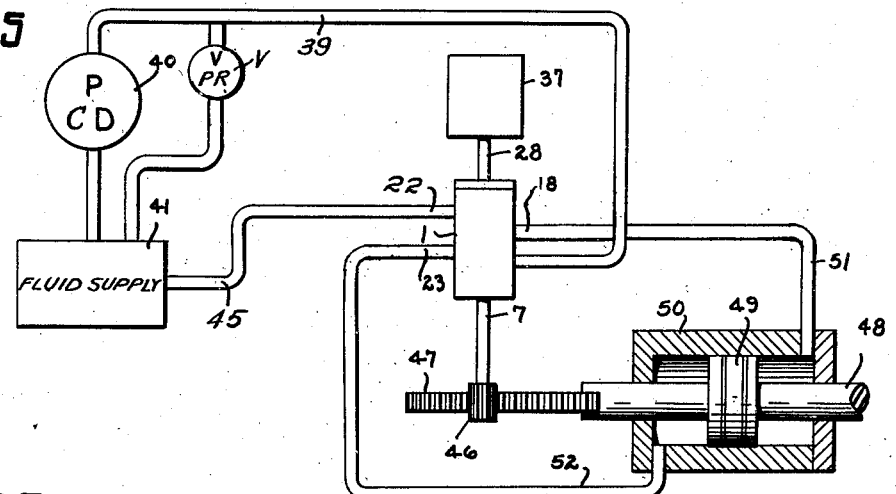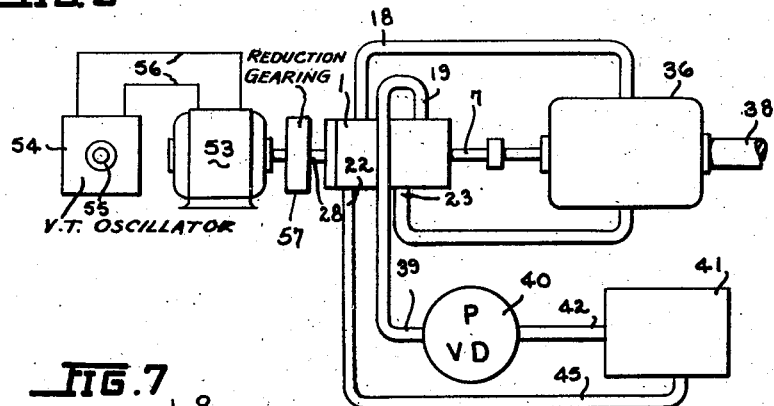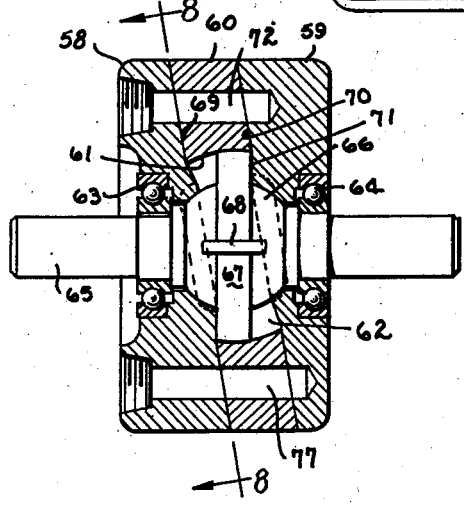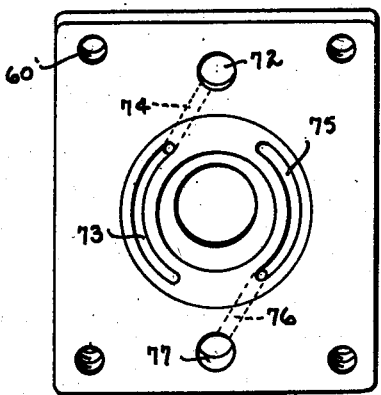

Patented Mar. 5, 1946

2,395,979

UNITED STATES PATENT OFFICE 2,395,979

TORQUE AMPLIFIER

Warren R. Tucker, Dayton, and George A. Waldie, Franklin, Ohio, assignors to The Hydraulic Development Corp. Inc., Mount Gilead, Ohio, a corporation of Delaware Application December 18, 1941, Serial No. 423,488

5 Claims. (Cl. 60—53)

The present invention relates to torque amplifiers, and more particularly to hydraulic mechanism for controlling great hydraulic forces by a relatively small manual, instrument, or machine-operated controlling force.

In the art of controlling force, energy, work done, etc., the initiating impulse may be quite small and in certain cases, there may be required a direct relation, such for example as synchronization in time or rate, between the operation of the initiating impulse and the controlled force of considerably greater magnitude. For example, in the operation of an airplane it may be desired to move one or more control surfaces from the pilot's position and depending on the size of the surface and the direction of movement, the force required at the control surface may be extremely large and yet the manually applied initiating force at the pilot's seat may be relatively small.

Again, in the case of direction-finding apparatus in an airplane, as for example when the devices are set for "automatic pilot" and the airplane is riding a radio beam, a direct mechanical connection may be desired between the radio compass and the rudder. The mechanical energy available at the compass is usually diminutive, whereas the energy required to move the rudder is exceedingly large.

In still other applications, for example in the automatic control of air conditioning or ventilating systems by a master indicator, a suitable form of connection other than electrical may be desired between the indicator and the controlled air conditioning or ventilating elements.

The primary object of the present invention is to provide a torque amplifier for converting small rotary efforts into powerful mechanical effects through the use of fluid pressure.

Another object is to provide a torque amplifier of the type referred to, in which there is a direct relation either in terms of speed or rate of movement, between the controlling effort and the controlled source of hydraulic power.

A further object is to provide a torque amplifier in which synchronism in speed or rate of movement is achieved between the initial rotary effort and the final mechanical movement of considerable power.

Other objects are to control the admission of pressure fluid to a hydraulic motor with apparatus which requires only a relatively small control effort; to provide a torque amplifier capable of being employed with ordinary indicating devices of instruments which respond to changes of electrical, mechanical or pneumatic energy to increase the power of the indicating instrument to a point sufficient to control remotely positioned devices or control surfaces.

The final and more general object is to provide a mechanical relay which can not only translate movements of low or diminutive power at the input into corresponding movements of high power at the output, but has an inexpensive construction and is constituted of such few parts that its operation is exceedingly dependable.

These objects are attained, in brief, by combining an improved form of follow-up or servo-valve with a hydraulic motor in such a way and mechanically connecting the units so that even the smallest rotary effort exerted at the servo-valve will cause the hydraulic motor to operate either at the same speed as the rotary effort or at any proportionate speed.

In the drawings:

Figure 1 is a vertical longitudinal section of an improved servo-valve which may be employed for carrying out the above objects. In this figure the shafts and the valve member are shown in elevation.

Figure 2 is a transverse sectional view taken along the line 2—2 in Figure 1.

Figure 3 shows a hydraulic system in which the improved servo-valve illustrated in Figure 1 is connected with a fluid motor for performing work.

Figure 4 is an enlarged perspective view of the valve member shown in Figure 1.

Figure 5 is a diagrammatic view with some of the devices in section, showing the application of the invention to a hydraulic motor of the reciprocatory type.

Figure 6 is a view, wholly in diagram, of the improved torque amplifier, in which the control is obtained through a device operated completely by electrical energy.

Figure 7 illustrates an improved form of pump which, in certain cases, can be used to advantage in operating the torque amplifier. The casing of the pump is shown in section but the rotor is illustrated in elevation.

Figure 8 is a perspective view of one of the casing elements of the pump shown in Figure 7.

Referring more particularly to Figures 1 and 2, which show the preferred form of servo-valve employed in the improved torque amplifier, the reference numeral 1 designates a cup-shaped casing which may be made of chilled cast iron, magnesium or aluminum alloy, synthetic resins or any other suitable material. The casing 1 is provided with a countersunk bore 2 which is adapted to serve as a seat or contact surface for a rotary sleeve 3. The latter may be made of the same material as the casing. The opening in the casing 1 is closed by a closure plate 4 which rests upon a shim 5, and is bolted in position by the screws 6.

The sleeve 3 terminates at the lower end in a shaft 7, the latter projecting through an opening 8 in the casing and being journalled in the ball bearing indicated at 9. The latter also serves as a rotary support for the sleeve 3. The upper end of the sleeve is counterbored, as indicated at 10, to receive ball bearings 11 which rest against a shouldered portion of the closure plate 4. Thus the sleeve 3 is supported at each end by ball bearings and may therefore be readily rotated. The sleeve may be provided with a number of circumferentially extending grooves $a$, $b$, $c$, $d$, these grooves having a depth which may be one-half the thickness of the sleeve and may be equidistantly spaced apart. In addition to the grooves, the sleeve is provided with a number of radially extending openings 12, 13, 14, 15 (of which four have been illustrated in Figure 2), these openings being preferably equidistantly spaced about the sleeve and extending between the lowermost surfaces of the grooves to the interior of the sleeve. The casing 1 is provided at one side with a pair of openings 16, 17 which communicate at one end with the grooves $b$, $d$ and at the other end are provided with conduits 18, 19. At the opposite side of the casing there is a similar pair of openings 20, 21 which communicate at one end with the grooves $a$, $c$ respectively and at the other end lead to the conduits 22 and 23 respectively.

Openings 12 and 14 extend inwardly from groove $b$ and openings 13 and 15 extend inwardly from groove $c$. Furthermore, a radial port 80 is provided in sleeve 3 effecting communication between grooves $a$ and 31, while a radial port 81 effects communication between grooves $d$ and 30, whereby opening 20 and conduit 22 are in constant communication with groove 31, and opening 17 and conduit 19 are in constant communication with groove 30.

The sleeve 3 is provided with a counterbore 24, extending through the center of the sleeve, for receiving a valve rotor 25 which is shown in enlarged form in Figure 4. The bottom of the bore 24 supports a ball bearing 26 on which the rotor is seated, and the latter is rotatably supported at the top by a ball bearing 27 which surrounds a shaft 28 secured to the valve member 25. A washer 29 is interposed between the ball bearing 27 and the lower surface of the closure plate 4. The rotor 25 is provided at the end with grooves 30, 31. There is a pair of slots 32, 33, these slots extending along the length of the rotor 25 and oppositely positioned with respect to the rotor. As shown, the slots communicate with the groove 31 but stop short of the groove 30. There is a similar pair of slots 34, 35 displaced 90 degrees from the other slots, but the slots 34, 35 communicate with the groove 30 and stop short of the groove 31. The shaft 7 may be connected to any suitable and well known type of fluid motor, indicated at 36 in Figure 3, while the shaft 28 which is connected to the rotor, may be coupled to any form of device, indicated at 37, from which a rotary effort is obtained. This device may, for example, be the movable coil of a radio compass, or manually controlled mechanism, in all of which cases it is desired that this effort shall be faithfully reproduced but magnified manyfold at the output shaft 38 of the fluid motor.

The conduit 19 is connected through tubing 39 to any suitable type of pump 40, of which a preferred type will be described in connection with Figures 7 and 8. This pump may be of the constant delivery, non-reversible type because, as will be explained hereinafter, the servo-valve serves to control the direction of the pressure fluid and also the amount of fluid supplied to the motor load. The fluid, which may be oil, is contained in a tank 41 and connected to the pump 40 through a pipe 42. The conduit 18 of the servo-valve is connected through conduit 43 to the fluid motor, the other side of the motor being connected through conduit 44 which is connected to the conduit 23. A pipe 45 is connected between the tank 41 and the conduit 22. A conduit 39a having therein a pressure relief valve V may connect conduit 39 to supply tank 41.

*Operation of the combined servo-valve and fluid motor*

Assume that the pump 40 is actuated, for example, by an electric motor so that pressure fluid is delivered through the tubing 39 to the conduit 19. Assume still further that the shaft 28 has been given a slight turn counterclockwise (Figure 2) so that the slots 34 and 35 of the valve are in complete register with the openings 12 and 14 of the sleeve. Slots 32 and 33 will also be in register respectively with the remaining openings 13 and 15 in the sleeve. Under these conditions, fluid under pressure will pass from conduit 19 through opening 17, groove $d$, port or ports 81, groove 30, slots 34 and 35, openings 12 and 14 and groove $b$, to opening 16 and thence through conduit 18 to motor 36. The fluid then operates to actuate motor 36, the latter exhausting through conduit 44 to opening 21, groove $c$, slots 32 and 33, groove 31, port or ports 80, opening 20, and conduit 22 to supply tank 41.

Now assume that the valve 25 has been moved counterclockwise (Figure 2) in such a manner that the slots 32 to 35 are sufficiently in register with openings 12 to 15 to permit the admission of at least small amounts of fluid to the motor 36. The motor 36 will turn until the sleeve 3 has been given an angular movement sufficient to bring the slots into closed position as shown at Figure 2. Thus the motor will have turned through the same angle of rotation as the valve 25. If the latter were given a continuous rotation by the device 37, the motor 36 would necessarily tend to continuously move the sleeve 3 to follow up the movement of valve 25.

Should an increased load be imposed upon motor 36 tending to cause sleeve 3 to lag behind valve 25, ports 12 and 14 are opened further to increase the pressure acting upon motor 36 and thus increase the torque exerted thereby to bring its speed to the same as that of valve 25. Thus, within its capacity, the torque developed by motor 36 is proportional to the load thereon. It is evident that when the shaft 28 is rotated at a relatively low speed the sleeve 3 will faithfully follow the slow speed of the valve 25, and the same thing is true at the higher speeds of the valve, assuming of course that the load on the motor 36 is not sufficiently high to prevent this automatic synchronizing action.

In order to reverse the fluid motor 36, it is only necessary to rotate the shaft 28 in the opposite direction. Assume that the valve 25 is rotated clockwise until the slot 32 is in full register with the opening 12. Under these conditions pressure fluid is brought to the conduit 19 and will flow around the groove $d$ in the sleeve 3 through the radial ports into groove 30 until it reaches the slots 34, 35. The fluid will then travel along said slots and will flow through the openings 15, 13 etc. until it reaches the groove $c$, whereupon it will gain the opening 21 and flow through the tubing 44, into the fluid motor. The latter will therefore be actuated in the opposite direction. The tubing 43 will now constitute the exhaust conduit, the fluid passing from the opening 16 into groove $b$, openings 12 and 14 into slots 32 and 33 to groove 31, thence through radial port or ports 80 to groove $a$ to conduit 22. From the conduit 22 the fluid is exhausted to the tank 41. Consequently, regardless of the direction of rotation of the rotary input device 37, the fluid motor will rotate in the same direction, and as stated hereinbefore, at synchronous speed. In case the valve rotor 25 will have moved through less than a whole revolution, the sleeve will turn through the same angle and then come to a stop. Thus, the final position of the shaft 38 will be the same, or substantially so, as that of the valve rotor.

Inasmuch as the pressure fluid reaches both sides of the valve 25 regardless of the direction of rotation of the valve, the latter is completely balanced on its circular seat so that little or no friction is exerted between the valve member and the sleeve. The same thing is true of the sleeve 3 because, as pointed out hereinbefore, pressure fluid gains access to both sides of the sleeve, regardless of the direction in which the shaft 28 is rotated. The end thrust of the valve is taken by the frictionless bearings 26, 27, while the ball bearings 9 and 11 serve the same purpose for the sleeve. Consequently, there is little or no friction between any of the moving parts, or between the rotating sleeve and the stationary casing 1. Any small rotary effort exerted at the shaft 28 is utilized merely for rotating the shaft because the sleeve 3 is rotated by the much more powerful motor 36. Thus the valve 25 merely serves to open and close hydraulic circuits, and this function is performed most effectively because when the valve, for example, is moved to the position shown in Figure 2, the fluid circuits through the servo-valve are interrupted so effectively that little or no leakage can take place even though extremely high fluid pressures are available at the pump.

It is apparent that the fluid motor may be of any size and therefore able to exert any amount of power, and yet the control exercised at the device 37 is positive and is adapted to any desired speed and utilizing either direction of rotation. Due to the manner in which the slots 32 to 35 cooperate with the radially extending openings 12 to 15, there is positively no tendency for the valve 25 to be rotated other than at the shaft 28 when high pressure fluid is being handled by the servo-valve. Thus no overrun of rotation is present in either direction, and the fluid motor will rotate through its proper angle of movement, greater or less than a complete revolution, corresponding exactly to the movement of the control device 37. It is apparent that the same rotary effects would be obtained if the shaft 7 were connected in any suitable manner to the rotor 25 instead of the sleeve. The sleeve would then be connected to the shaft 28 and become the control member.

Instead of employing a fluid motor which serves to rotate the shaft 38 when fluid pressure is applied thereto, it may be desirable to translate the rotary effort of the control device 37 into a reciprocatory movement. This modification has been shown in Figure 5, and in this case the shaft 7 of the servo-valve is provided with a pinion 46 which meshes with a rack 47. The latter is secured to a piston rod 48, carrying a piston 49 and contained within a cylinder 50. Conduits 51 and 52 are taken from opposite ends of the cylinder and connected respectively with conduits 18 and 23 of the servo-valve casing 1.

The operation of the system shown in Figure 5 is somewhat similar to that which has been described in connection with Figure 3 except that when the shaft 28 is rotated by the control element 37, fluid pressure is supplied either to the conduit 51 or 52, depending on the direction in which the control element 37 is rotated. Thus the piston 49 becomes double-acting, assuming that the element 37 is rotated alternately in opposite directions and the rod 48 is given a reciprocatory movement to perform work. The system shown in Figure 5 is particularly well adapted for actuating the control surfaces of an airplane, all of which move through a limited angle corresponding to the movement of the rod 48. One advantage of this system is that the shaft 28 may be rotated through quite a number of revolutions and yet the piston 49 will only have moved through a limited lateral distance, depending on the number of teeth ratio between the pinion 46 and the rack 47. It is apparent that if desired a reciprocatory movement initiated, for example, by the pilot's control stick, may be imparted to the shaft 28 in terms of a rotary effort, so that the movements of the control stick will be exactly synchronized or bear any desired proportionate movement with respect to the movement of the rod 48. Thus the movement of the control stick from, for example a vertical position to the left, will result in the rotary movement of the shaft 28 in a particular direction, and a movement of the control stick to the right will cause the shaft 28 to move in the opposite direction, causing correspondingly opposite movements of the piston 49.

In Figure 6 another modified system is shown, employing the improved torque amplifier. The servo-valve, fluid motor, pump, tank and interconnecting conduits may be similar to those shown in Figure 3 and for that reason bear the same reference numerals. However, in this figure the shaft 28 is rotated by a synchronous motor, indicated at 53, which may be of very small size and either energized directly or controlled in any suitable and well known manner by a vacuum tube oscillation generator 54. The oscillations developed by the generator may be controlled by a dial indicated at 55, and the output of the generator is taken through the conductors 56, either directly to the field winding of the synchronous motor 53 or any other control winding of the motor. The synchronous motor, for example, may be of a size not much greater than that used in an ordinary electric clock, which it has been found is more than sufficient to operate the valve 25. Thus by turning the dial 55, which controls the frequency of the oscillations developed at 54, the speed of the shaft 28 is controlled, which in turn, controls the speed of the fluid motor 36, as has been described hereinbefore. Any suitable form of reduction gearing, indicated by the rectangle 57, between the synchronous motor 53 and the servo-valve 1 may be employed. Moreover, the speed reduction apparatus 57 may be of a variable character, such as the ordinary so-called "variable transmissions," so that the synchronous motor 53 may be operated at constant synchronous speed and the speed of the shaft 28 can be controlled at the variable transmission 57. It is apparent that if desired the oscillation generator 54 and the small synchronous motor 53 may be replaced, for example, by the movable coil of a radio compass, in which case the shaft 38 will turn in a direction and at such a speed comparable to the movement of the compass coil.

In Figures 7 and 8 there is illustrated an improved form of pump, which it has been found operates extremely satisfactorily in connection with the torque amplifier including the improved servo-valve shown in Figure 1. However, it will be understood that our invention is not limited to the particular form of pump illustrated, but the latter represents a diminutive, large-output pump of the rotor type which is particularly well suited to the valve-opening and closing operations of the improved servo-valve. As illustrated, this pump consists essentially of a plurality of end blocks 58, 59 which are spaced apart by an intermediate block 60, the three blocks being secured in position by bolts, of which only the openings 60' are indicated in Figure 8. The intermediate block 60 is provided with a centrally disposed opening 61, this opening being curved along its depth for reasons which will be apparent when the impeller construction has been described. The opening 61 constitutes a pumping chamber which has been designated 62.

The blocks 58, 59 are provided with countersunk openings which are adapted to receive the ball bearings 63, 64 for supporting the rotor shaft 65. The rotor is formed essentially of a spherical portion 66 which is seated in spherically curved surfaces formed in the blocks 58, 59. This spherical portion of the rotor is provided with an outwardly extending annular ring 67, the diameter of which is such as to cause the ring snugly to fit the opening 61. The ring 67 is provided about its periphery with radially extending slots, and each slot carries a vane or blade 68 in a slidable fit. These blades are adapted to move within their slots in a direction parallel to the direction of the shaft 65, and at all times make contact with the active surfaces of the pumping chamber 62 as the impeller is rotated.

In order to provide pressure and exhaust chambers within the pump the blocks 58, 59 are given tapered surfaces, as indicated at 69 and 70, respectively, the intermediate block 60 being also tapered as indicated, so that the line of joining between the various blocks will extend diagonally with respect to the vertical plane. That portion of the active surfaces of the blocks 58, 59 contained within the pumping chamber 62 is given an additional taper, as illustrated, in order that the upper right-hand edge and the lower left-hand edge of the ring 67 shall bear against a vertical surface, indicated at 71. It is apparent that the spaces to the left of the upper edge of the ring 67 and to the right of the lower edge of said ring constitute suction chambers, so that as the rotor 66 is rotated the vanes 68 will tend to move the fluid collected in these spaces around to that position at which there is no space between the ring 67 and the blocks 58, 59, i. e. at the positions indicated at 71. Consequently, these positions represent those places where pressure is introduced into the fluid. Communication between these suction chambers and an inlet port 72 is obtained through a pair of arcuate grooves 73, one of which is provided in the block 58 and the other is provided in the block 59 but positioned diagonally with respect to one another. This pair of grooves, which obviously will be positioned on opposite sides of the longitudinal axis of the pump, are connected together in any suitable manner through passageways, of which only one designated 74, has been illustrated in Figure 8.

Communication with the pressure chambers formed at the positions 71 (Figure 7) is made through a pair of arcuate grooves 75, of which only one is shown in Figure 8, and which are provided in the blocks 58 and 59. As in the case of the pair of suction slots 73, the pair of pressure grooves 75 is positioned diagonally with respect to one another on opposite sides of the longitudinal axis of the pump and are connected together through suitable conduits, of which one 76 has been illustrated in Figure 8. The conduit 76 communicates with the pressure port 77. The suction port 72 and the pressure port 77 are brought out through conduits 42 and 39, respectively (see Figure 3). It is apparent that as the rotor 66 is rotated the vanes 68 are caused to move in their slots to follow the shape of the pumping chamber 62, and the oil or other fluid present within the pumping chamber is caused to be forced, by the operation of the vanes 68, into the pressure grooves 75. The rotor, therefore, serves to draw fluid into the pumping chamber through the port 72, into the pair of grooves 73 and out through the pair of pressure grooves 75, into the port 77.

As the shaft 65 is rotated faster the output of the pump becomes greater. The pump shown in Figures 7 and 8 is characterized by a large output at relatively high pressures for a given size of pump so that a pump of this character, particularly when made of light metal, is well suited to provide the necessary pressure fluid for operating the torque amplifiers shown in Figures 3, 5 and 6. However, it will be understood that any other type of pump in which a continuous flow of fluid is available may be employed.

From the foregoing it is evident that we have invented a new and useful form of torque amplifier, in which the servo-valve shown in Figure 1, the fluid motor and the pump shown in Figures 7 and 8 all cooperate in an efficient manner to provide a system in which a relatively small controlling force can control a great hydraulic force represented by the fluid motor 36; and the operation is such that a high degree of synchronism is obtained between the rotary controlling force and the controlled force. This controlling force may be exercised either by manual operation or by an electrical instrument, or by a machine or any other kind of mechanism. This small controlling force may constitute a timing device, exemplified in Figure 6 as a synchronous motor 53 energized by the control oscillator 54. The servo-valve I, in effect, constitutes a fluid distributor valve which is controlled by the timing device in such a way that the oscillator 54 determines the speed of the powerful hydraulic motor 36. Thus the latter is controlled accurately by the use of an extremely small controlling force, due to the interposition of the servo-valve or distributor I.

The pump shown in Figure 7 represents a type which provides pressure fluid of a character most suitable for control by the servo-valve shown in Figure 1, and to that extent constitutes a complementary unit of the servo-valve in obtaining the optimum results from the hydraulic systems disclosed in Figures 3, 5 and 6. This pump is intended to be rotated at fast speeds, and notwithstanding its relatively small size has a large output compared with the volumetric size of the pump. The servo-valve 1 is also of the rotary type and would normally be operated at relatively fast speeds, similar to the pump, so that when the various passageways through the servo-valve have an area to accommodate the full output of the pump, this output may be transmitted through the servo-valve without the slightest throttling effect. Thus the pump and the servo-valve operate unusually well together since both of these devices are of the same general type, in that both operate on the rotary principle and both are capable of being operated at relatively fast speeds; and one device can accommodate the entire output of the other device when full open-valve conditions at the servo-valve are required. However, it will be understood that the servo-valve 1 may be supplied with pressure fluid, if desired, from other types of pumps than that shown in Figure 7, but the point is made that this particular type of pump operates exceedingly satisfactorily with the rotary type of servo-valve disclosed herein.

It will be understood that we desire to comprehend within our invention such modifications as come within the scope of the claims.

Having thus fully described our invention, what we claim as new and desire to secure by Letters Patent is:

1. A torque amplifier comprising, in combination, a rotary servo-valve and a rotary hydraulic motor supplied with fluid from said servo-valve, said servo-valve including a rotor and a surrounding rotary sleeve, said rotor and sleeve having passageways therein so arranged that when the rotor is rotated relatively to the sleeve the said passageways come into register to permit pressure fluid to pass through the servo-valve, the movable portion of said motor being connected to rotate said sleeve, and means for controlling the speed of movement of said rotor whereby when the rotor is rotated pressure fluid is supplied to the motor to cause the sleeve to rotate through the same angular movement at the same rate as that of the rotor, said means comprising a synchronous motor connected to rotate said rotor and variable frequency generator for supplying current thereto.

2. A torque amplifier comprising, in combination, a rotary servo-valve and a rotary hydraulic motor supplied with fluid from said servo-valve, said valve including a rotor and a surrounding rotary sleeve, said rotor and sleeve having passageways therein so arranged that when the rotor is rotated relatively to the sleeve the said passageways come into register to permit pressure fluid to pass through the valve, the rotating portion of said motor being connected to rotate said sleeve, and means for controlling the speed of movement of said rotor whereby when the rotor is rotated pressure fluid is supplied to the motor to cause the sleeve to rotate in substantial synchronism with the rotations of the rotor, said means comprising a synchronous motor connected to rotate said motor and a variable frequency generator supplying current thereto whereby the speed of rotation of the rotor is varied and the rate of movement of the fluid motor is correspondingly controlled.

3. A torque amplifier comprising, in combination, a rotary servo-valve and a rotary reversible hydraulic motor supplied with fluid from said servo-valve, said servo-valve including a rotor and a surrounding rotary sleeve, said rotor and sleeve having passageways therein so arranged that when the rotor is rotated relatively to the sleeve in either direction from a normally closed position the said passageways come into register to permit pressure fluid to pass through the servo-valve to rotate said motor in a corresponding direction, said motor being connected to rotate said sleeve toward said normal position, and means for initiating movement of said rotor whereby when the rotor is rotated, pressure fluid is supplied to the motor to cause the sleeve to rotate through the angular distance as the movement of the rotor, said means comprising a rotary power device which operates at constant speed and variable speed transmission mechanism interposed between said device and said sleeve.

4. In a torque amplifier, a timing means, a hydraulic power circuit controlled and synchronized by the timing means, means for controlling the hydraulic fluid flow by said timing means, and a reversible rotary hydraulic motor in said circuit and having a power output shaft connected to said aforementioned controlling means associated with the timing means for timing and controlling the fluid flow, whereby the timing means controls the synchronous movement of the motor as actuated by said hydraulic circuit.

5. In a torque amplifier, a timing means, a hydraulic power circuit controlled and synchronized by the timing means, means for controlling the hydraulic fluid flow in said circuit, and a reversible rotary hydraulic motor in said circuit and having a power output shaft connected to said aforementioned controlling means associated with said timing means for timing and controlling the fluid flow, whereby the timing means controls the synchronous movement of the motor as actuated by said hydraulic circuit.

WARREN R. TUCKER.
GEORGE A. WALDIE.